United States Patent
Arai et al.

(10) Patent No.: US 6,947,631 B2
(45) Date of Patent: Sep. 20, 2005

(54) WAVEGUIDE-TYPE OPTICAL MULTIPLEXER/DEMULTIPLEXER

(75) Inventors: Hideaki Arai, Tokyo (JP); Takafumi Chiba, Tokyo (JP); Hisato Uetsuka, Tokyo (JP); Masahiro Hikage, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 123 days.

(21) Appl. No.: 10/291,064

(22) Filed: Nov. 8, 2002

(65) Prior Publication Data

US 2003/0091071 A1 May 15, 2003

(30) Foreign Application Priority Data

Nov. 9, 2001 (JP) ........................................ 2001-344779

(51) Int. Cl.[7] .............................. G02B 6/28; G02B 6/42; G02B 6/26
(52) U.S. Cl. ............................ 385/24; 385/15; 385/27; 385/31; 385/39; 385/41; 385/42; 398/79; 398/82
(58) Field of Search ............................... 385/15, 24, 27, 385/31, 39, 41, 42; 398/79, 82

(56) References Cited

U.S. PATENT DOCUMENTS

| | | | | |
|---|---|---|---|---|
| 5,596,661 A | * | 1/1997 | Henry et al. ................... | 385/24 |
| 5,680,490 A | * | 10/1997 | Cohen et al. .................. | 385/24 |
| 5,852,505 A | * | 12/1998 | Li ................................ | 398/58 |
| 6,512,865 B1 | * | 1/2003 | Shen et al. .................... | 385/24 |
| 6,684,002 B2 | * | 1/2004 | Xie et al. ...................... | 385/15 |
| 6,684,006 B2 | * | 1/2004 | Zhao ............................ | 385/24 |
| 6,768,843 B1 | * | 7/2004 | Sidick .......................... | 385/39 |
| 2001/0048786 A1 | | 12/2001 | Arai et al. .................... | 385/24 |
| 2001/0051018 A1 | | 12/2001 | Arai et al. .................... | 385/24 |
| 2003/0072522 A1 | * | 4/2003 | Zhao ............................ | 385/27 |

* cited by examiner

*Primary Examiner*—Akm Enayet Ullah
*Assistant Examiner*—Daniel Petkovsek
(74) *Attorney, Agent, or Firm*—James Conte; Barnes & Thornburg LLP

(57) ABSTRACT

A waveguide-type optical multiplexer/demultiplexer with low crosstalk characteristics and reduced wavelength dispersion is provided. A waveguide-type optical multiplexer/demultiplexer comprising, first, second and third optical multiplexer/demultiplexer circuits connected in multistage, each multiplexer/demultiplexer circuit has four input-output ports, third input-output port of first optical multiplexer/demultiplexer circuit is connected to third input-output port of second optical multiplexer/demultiplexer circuit, and fourth input-output port of first optical multiplexer/demultiplexer circuit is connected to fourth input-output port of third optical multiplexer/demultiplexer circuit, when wavelength division multiplex signals having wavelength $\lambda_1, \lambda_2, \lambda_3, \lambda_4, \lambda_5, \lambda_6$ ... are input through first input-output port of first optical multiplexer/demultiplexer circuit, multiplex signals of odd wavelength $\lambda_1, \lambda_3, \lambda_5$ ... are output from first input-output port of second optical multiplexer/demultiplexer circuit, and multiplex signals of even wavelength $\lambda_2, \lambda_4, \lambda_6$ ... are output from first input-output port of third optical multiplexer/demultiplexer circuit.

6 Claims, 14 Drawing Sheets

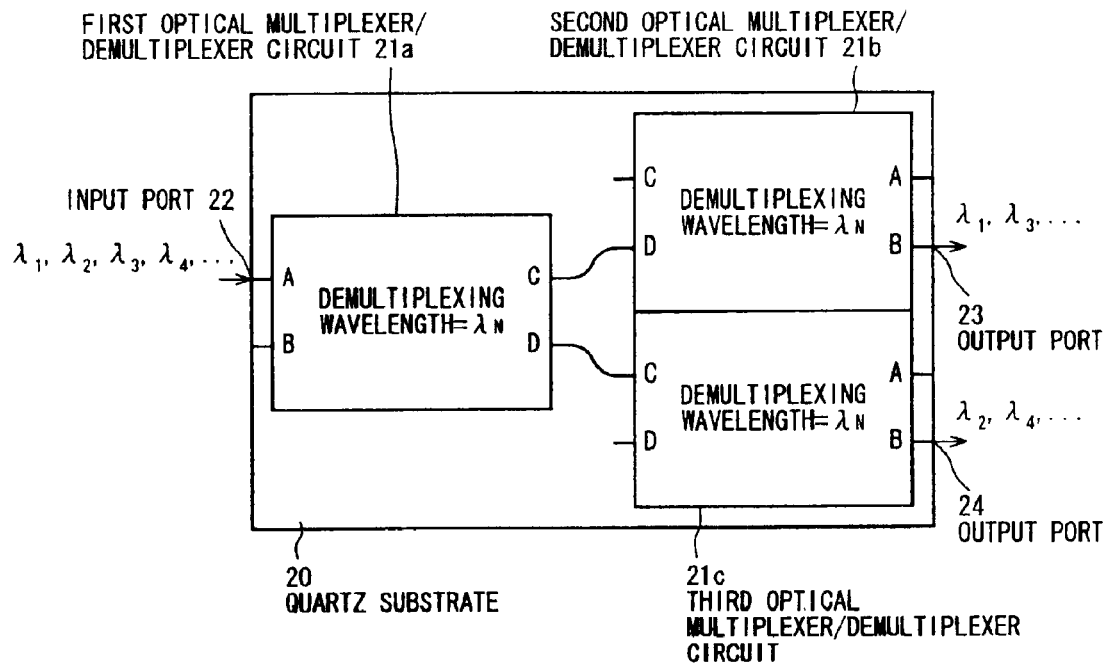
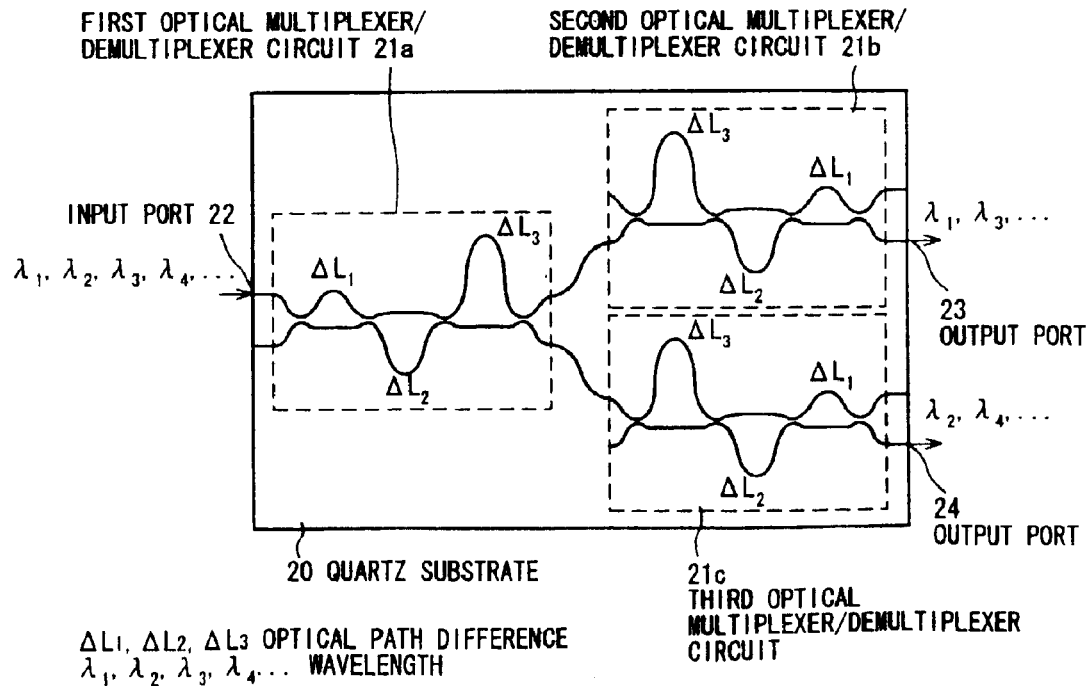

WAVEGUIDE-TYPE OPTICAL MULTIPLEXER/DEMULTIPLEXER

BACKGROUND OF THE INVENTION

1. Field of the Invention

The present invention relates to a waveguide-type optical multiplexer/demultiplexer, and more specifically to a waveguide-type optical multiplexer/demultiplexer provided with low crosstalk characteristics and reduced wavelength dispersion.

2. Prior Art

An interleave system which is one of wavelength multiplexing communications in next generation requires an optical multiplexer/demultiplexer provided with a function that a signal with certain channel wavelength spacing is demultiplexer to two signals with twice of said channel wavelength spacing, or contrary to this, two signals are multiplexed to one signal.

FIG. 1(a) and FIG. 1(b) show an example such optical multiplexer/demultiplexer. FIG. 1(a) shows an arrangement of first to third optical multiplexer/demultiplexer circuits 21a, 21b, 21c each of which is a constituent unit of this sort of optical multiplexer/demultiplexer and has demultiplexer wavelength $\lambda_N$ on a quartz substrate 20, and FIG. 1(b) shows connecting structure of first to third optical multiplexer/demultiplexer circuits 21a, 21b, 21c.

FIG. 2 shows detailed constitution of one of these optical multiplexer/demultiplexer circuits 21a, 21b, 21c connected in multistage. Numeral 30 denotes a first waveguide provided with phase difference giving portions 14, 17, 18 which arise interference at predetermined portion, and numeral 40 denotes a second waveguide provided with phase difference giving portions 15, 16, 19 which arise interference at the same portion as the first waveguide 30.

Numerals 10 to 13 denote optical coupling portions which couple the first waveguide 30 and the second waveguide 40 each other at predetermined portions. By coupling the first waveguide 30 and the second waveguide 40 as explained above, Mach-Zehnder interference circuit is constituted. Coupling efficiency at optical coupling portions 10, 11 is about 50%, and at optical coupling portions 12, 13 is about 3.5%. In FIG. 2, numerals 6 to 9 denote respectively first to fourth input-output ports each of which is formed at ends of first and second waveguides 30, 40.

According to above constitution, first to fourth input-output ports A, B, C, D of first to third optical multiplexer/demultiplexer circuits 21a, 21b, 21c in FIG. 1(a) correspond respectively to first to fourth input-output ports 6, 7, 8, 9 in FIG. 2. Further, input port 22 in FIG. 1(a) and FIG. 1(b) corresponds to input port 6 in FIG. 2, and output ports 23, 24 in FIG. 1(a) and FIG. 1(b) correspond to output port 7 in FIG. 2. Furthermore, $\Delta L_1$, $\Delta L_2$ and $\Delta L_3$ in FIG. 1(b) denote optical path difference which are given respectively between phase difference giving portions 15 and 14, between 16 and 17, and between 19 and 18 by formation of phase difference giving portions 14, 15, 16, 17, 18 and 19 in FIG. 2.

With respect to above explained first to third optical multiplexer/demultiplexer circuits 21a, 21b, 21c shown in FIG. 1(a), when wavelength division multiplex signals of wavelength $\lambda_1, \lambda_2, \lambda_3, \lambda_4, \lambda_5, \lambda_6$ . . . are input through the first input-output port A, multiplex signals of odd channel wavelength $\lambda_1, \lambda_3, \lambda_5$ . . . are output from the third input-output port C, and multiplex signals of even channel wavelength $\lambda_2, \lambda_4, \lambda_6$ . . . are output from the fourth input-output port D.

On the other hand, when wavelength division multiplex signals of wave length $\lambda_1, \lambda_2, \lambda_3, \lambda_4, \lambda_5, \lambda_6$ . . . are input through the second input-output port B, multiplex signals of odd channel wave length $\lambda_1, \lambda_3, \lambda_5$ . . . are output from the fourth input-output port D, and multiplex signals of even channel wavelength $\lambda_2, \lambda_4, \lambda_6$ . . . are output from the third input-output port C.

In the optical multiplexer/demultiplexer shown in FIG. 1(a), the first input-output port A of the optical multiplexer/demultiplexer circuit 21a is selected as the whole input port, further, the third input-output port C of the first optical multiplexer/demultiplexer circuit 21a is connected to the fourth input-output port D of the second optical multiplexer/demultiplexer circuit 21b, and the fourth input-output port D of the first optical multiplexer/demultiplexer circuit 21a is connected to the third input-output port C of the third optical multiplexer/demultiplexer circuit 21c.

Further referring to FIG. 1(b), defining that wavelength within using wavelength range is $\lambda$s and equivalent refractive index of waveguide at wavelength $\lambda$s is Neff, and assuming that $\Delta L_1$ is determined by multiplexing/demultiplexing wavelength, relations $\Delta L_2 = 2 \times \Delta L_1$ and $\Delta L_3 = 4 \times \Delta L_1 - \lambda s/(\text{Neff} \times 2)$ are given.

Concretely, in order to obtain operating wavelength range from 1520 nm to 1620 nm, $\Delta L_1$ is set about 1 mm, $\Delta L_2$ is set about 2 mm, $\Delta L_3$ is set about 4 mm, and spacing of wavelength $\lambda_1, \lambda_2, \lambda_3, \lambda_4, \lambda_5, \lambda_6$ . . . is set about 0.8 nm (100 GHz in frequency).

FIG. 3 shows wavelength dispersion characteristics and permeable index characteristics of channel path band at input-output ports 22, 23 of optical multiplexer/demultiplexer circuits 21a, 21b in above described prior art waveguide-type optical multiplexer/demultiplexer. According to the figure, permeable index characteristics between optical multiplexer/demultiplexer circuits 21a and 21b is identical, however, wavelength dispersion characteristics between optical multiplexer/demultiplexer circuits 21a and 21b is identical in absolute value but reverse in phase. Further, because characteristics of optical multiplexer/demultiplexer circuits 21a and 21b are added as the whole optical multiplexer/demultiplexer, wavelength dispersion in this example is characterized to zero in principle, Accordingly, the above described prior art waveguide-type optical multiplexer/demultiplexer (hereinafter referred to as "prior art 1") is appraised as a optical multiplexer/demultiplexer provided with superior characteristics, on the other hand, considering application to actively developing transmission rate 40 Gbps class system, crosstalk characteristic is not necessarily sufficient.

Referring to FIG. 4, crosstalk from channel of center wavelength $\lambda_{n+1}$ to channel of center wavelength $\lambda_n$ is considered. In a system that high speed modulation such as transmission rate 40 Gbps is carried out, because influence of the modulating side wave band affects to adjacent channels, low crosstalk characteristic is required even for wavelength apart from the center wavelength. However, in the optical multiplexer/demultiplexer of prior art 1, crosstalk of 0.35 nm apart from center wavelength is 17 dB. This crosstalk level is so high that may cause problem in practical use.

An optical multiplexer/demultiplexer (hereinafter referred to as "prior art 2") as shown in FIG. 5(a) and FIG. 5(b) is proposed to improve the high crosstalk characteristic. This optical multiplexer/demultiplexer is almost same construction as that shown in FIG. 1(a) and FIG. 1(b), however, in order to improve crosstalk characteristic, demultiplexer wavelength $\lambda_n$ of the first optical multiplexer/demultiplexer circuit 26a is shifted $\Delta\lambda=0.15$ nm to short wave direction in respect of the first optical multiplexer/demultiplexer circuit 21a of prior art 1, and demultiplexer wavelength $\lambda_n$ of the second and third optical multiplexer/demultiplexer circuits 26b, 26c are shifted $\Delta\lambda=0.15$ nm to long wave direction in respect of the second and third optical multiplexer/demultiplexer circuits 21b, 21c of prior art 1.

Concretely, as shown in FIG. 5(b), optical path difference $\Delta L_1$, $\Delta L_2$ and $\Delta L_3$ of the optical multiplexer/demultiplexer circuits 26(a), 26b, 26c are equivalently shortened or lengthened $\delta1$, $\delta2$ and $\delta3$ respectively. For example, $\delta1$ is set about 0.1 μm, $\delta2$ is set about 0.2 μm and $\delta3$ is set about 0.4 μm. Wherein equivalently means either to change waveguide length or to change optical path length by changing refractive index of waveguide without changing waveguide length. In FIG. 5(a) and FIG. 5(b), numeral 25 denotes a quartz substrate, numeral 27 denotes a input port and numerals 28, 29 denote output ports.

In the waveguide-type optical multiplexer/demultiplexer of prior art 2 as described above, if crosstalk characteristic level is estimated based on FIG. 4, crosstalk of 0.35 nm apart from center wavelength is 27 dB. This crosstalk level is confirmed to be sufficient characteristic in practical use.

However, in accordance with the waveguide-type optical multiplexer/demultiplexer of prior art 2, in spite of obtaining excellent crosstalk characteristics, defect of increasing wavelength dispersion is appeared.

FIG. 6 shows wavelength dispersion characteristics and permeable index characteristics of channel path band at output port 28 of prior art 2. As shown in the figure, wavelength dispersion of optical multiplexer/demultiplexer circuits 26a and 26b is increased near the center of channel, further, characteristics of optical multiplexer/demultiplexer circuit 26a and 26b are added as a whole optical multiplexer/demultiplexer, accordingly wavelength dispersion at the center of channel shows nearly 30 ps/nm.

This dispersion value is obviously high level and a serious problem, especially, in high speed transmission system such as 40 Gbps transmission rate.

SUMMARY OF THE INVENTION

An object of the present invention is to provide an optical multiplexer/demultiplexer provided with low crosstalk characteristics and reduced wavelength dispersion.

In accordance with the first feature of this invention, there is provided an optical multiplexer/demultiplexer provided with Mach-Zehnder interference circuits connected in multistage, comprising first, second and third optical multiplexer/demultiplexer circuits, said each optical multiplexer/demultiplexer circuit is constituted to input wavelength division multiplex signals having predetermined wavelength spacing and wavelength $\lambda_1$, $\lambda_{.2}$, $\lambda_4$, $\lambda_{.5}$, $\lambda_{.6}$. through a first input-output port and to output multiplex signals of odd wavelength $\lambda_1$, $\lambda_3$, $\lambda_{.5}$ . . . from a third input-output port and multiplex signals of even wavelength $\lambda_{.2}$, $\lambda_{.4}$, $\lambda_6$ . . . from a fourth input-output port, and to input wavelength division multiplex signals of wavelength $\lambda_1$, $\lambda_{.2}$, $\lambda_{.3}$, $\lambda_{.4}$, $\lambda_{.5}$, $\lambda_{.6}$ . . . through a second input-output port and to output multiplex signals of odd wavelength $\lambda_{.1}$, $\lambda_{.3}$, $\lambda_5$ . . . from a fourth input-output port and multiplex signals of even wavelength $\lambda_2$, $\lambda_{.4}$, $\lambda_6$ . . . from a third input-output port, said third input-output port of said first optical multiplexer/demultiplexer circuit is connected to said third input-output port of said second optical multiplexer/demultiplexer circuit, and said fourth input-output port of said first optical multiplexer/demultiplexer circuit is connected to said fourth input-output port of said third multiplexer/demultiplexer circuit, said wavelength division multiplex signal shaving wavelength $\lambda_{.1}$, $\lambda_{.2}$, $\lambda_{.3}$, $\lambda_{.4}$, $\lambda_5$, $\lambda_{.6}$ . . . are input through said first input-output port of said first optical multiplexer/demultiplexer circuit, multiplex signals of odd wavelength $\lambda_{.1}$, $\lambda_{.3}$, $\lambda_5$ . . . are output from said first input-output port of said second optical multiplexer/demultiplexer circuit, and multiplex signals of even wavelength $\lambda_{.2}$, $\lambda_{.4}$, $\lambda_{.6}$ . . . are output from said first input-output port of said third optical multiplexer/demultiplexer circuit.

In accordance with the second feature of this invention, there is provided an optical multiplexer/demultiplexer provided with Mach-Zehnder interference circuits connected in multistage, comprising first, second and third optical multiplexer/demultiplexer circuits constituted to output multiplex signals of odd wavelength $\lambda_1$, $\lambda_{.3}$, $\lambda_{.5}$ . . . from a third input-output port, and multiplex signals of even wavelength $\lambda_{.2}$, $\lambda_{.4}$, $\lambda_6$ . . . from a fourth input-output port, when wavelength division multiplex signals having predetermined wavelength spacing and wavelength $\lambda_{.1}$, $\lambda_{.2}$, $\lambda_{.3}$, $\lambda_{.4}$, $\lambda_{.5}$, $\lambda_{.6}$ . . . are input through a first input-output port, and to output multiplex signals of odd wavelength $\lambda_1$, $\lambda_{.3}$, $\lambda_{.5}$ . . . from a fourth input-output port, and multiplex signals of even wavelength $\lambda_{.2}$, $\lambda_{.4}$, $\lambda_6$ . . . from a third input-output port, when wavelength division multiplex signals of wavelength $\lambda_1$, $\lambda_2$, $\lambda_{.3}$, $\lambda_4$, $\lambda_{.5}$, $\lambda_{.6}$ . . . are input through a second input-output port, said third input-output port of said first optical multiplexer/demultiplexer circuit is connected to said first input-output port of said second optical multiplexer/demultiplexer circuit, and said fourth input-output port of said first optical multiplexer/demultiplexer circuit is connected to said first input-output port of said third optical multiplexer/demultiplexer circuit, said wavelength division multiplex signals having wavelength $\lambda_1$, $\lambda_2$, $\lambda_3$, $\lambda_4$, $\lambda_5$, $\lambda_6$ . . . are input through said first input-output port of said first optical multiplexer/demultiplexer circuit, multiplex signals of odd wavelength $\lambda_1$, $\lambda_3$, $\lambda_5$ . . . are output from said third input-output port of said second optical multiplexer/demultiplexer circuit, and multiplex signals of even wavelength $\lambda_2$, $\lambda_{.4}$, $\lambda_{.6}$ . . . are output from said fourth input-output port of said third optical multiplexer/demultiplexer circuit.

In the execution of the present invention, it is preferable to shift demultiplex wavelength of first to third optical multiplexer/demultiplexer circuits in respect of center wavelength. Concretely, wavelength of the first optical multiplexer/demultiplexer circuit is shifted slight wavelength $\Delta\lambda$ to short wave direction or long wave direction, on the other hand wavelength of the second and third optical multiplexer/demultiplexer circuit is shifted slight wavelength $\Delta\lambda$ to long wave direction or short wave direction. By establishing wavelength like above, wavelength multiplexing communication with advanced low level crosstalk become possible.

In an arrangement of first to third optical multiplexer/demultiplexer circuits, various forms such as tandem or parallel are considered, compactness of the whole constitution is advantageously obtained by parallel arrangement.

BRIEF DESCRIPTION OF THE DRAWINGS

FIG. 1(a) is an explanatory view showing an arrangement of first to third optical multiplexer/demultiplexer circuits of a prior art.

FIG. 1(b) is an explanatory view showing connecting state of waveguides of first to third optical multiplexer/demultiplexer circuits of a prior art.

DESCRIPTION OF THE PREFERRED EMBODIMENTS

Preferred embodiments of the present invention will be explained in conjunction with accompanying drawings.

Figure 2:
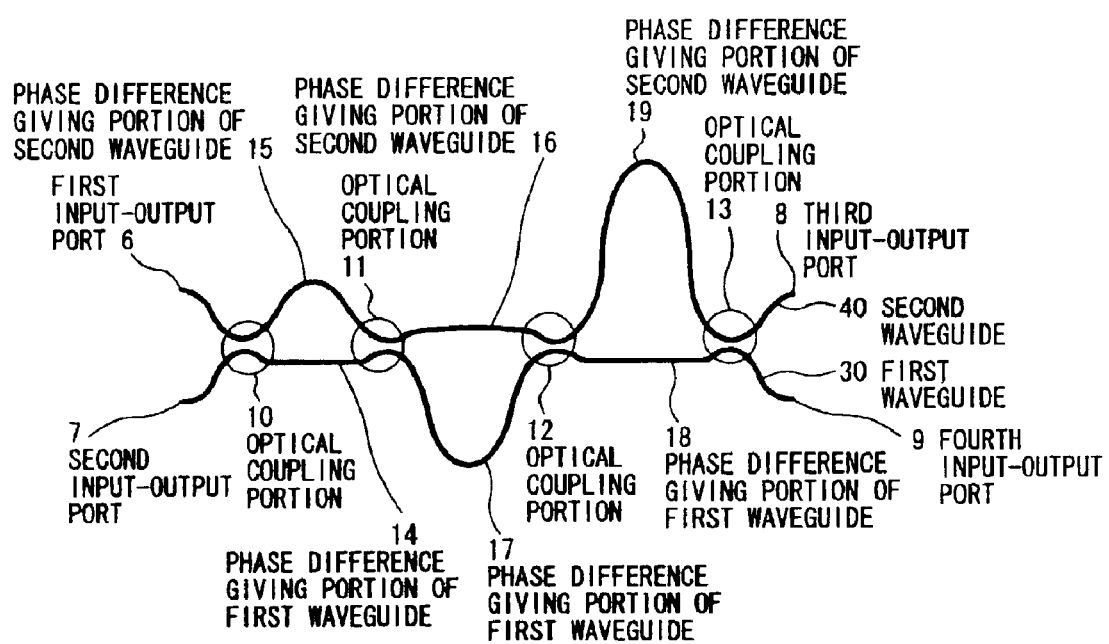
FIG. 2 is an explanatory view showing detailed constitution of optical multiplexer/demultiplexer circuit (Mach-Zehnder interference circuit).
Figure 3:
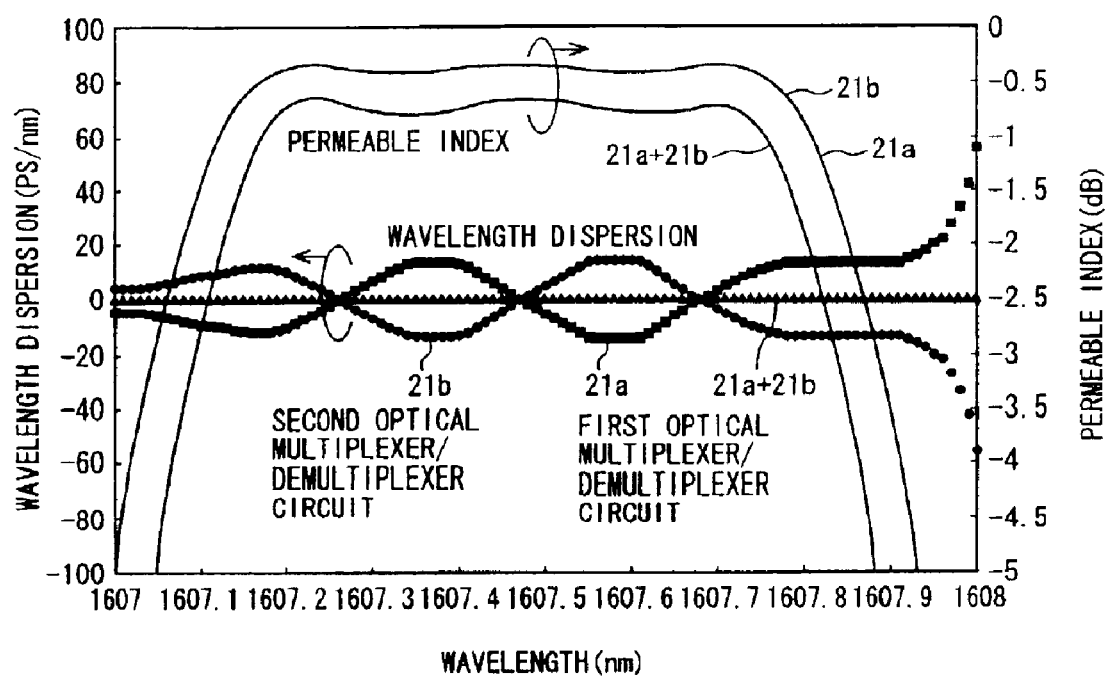
FIG. 3 is an explanatory view showing wavelength dispersion characteristics and permeable index characteristics of a prior art.
Figure 7A:
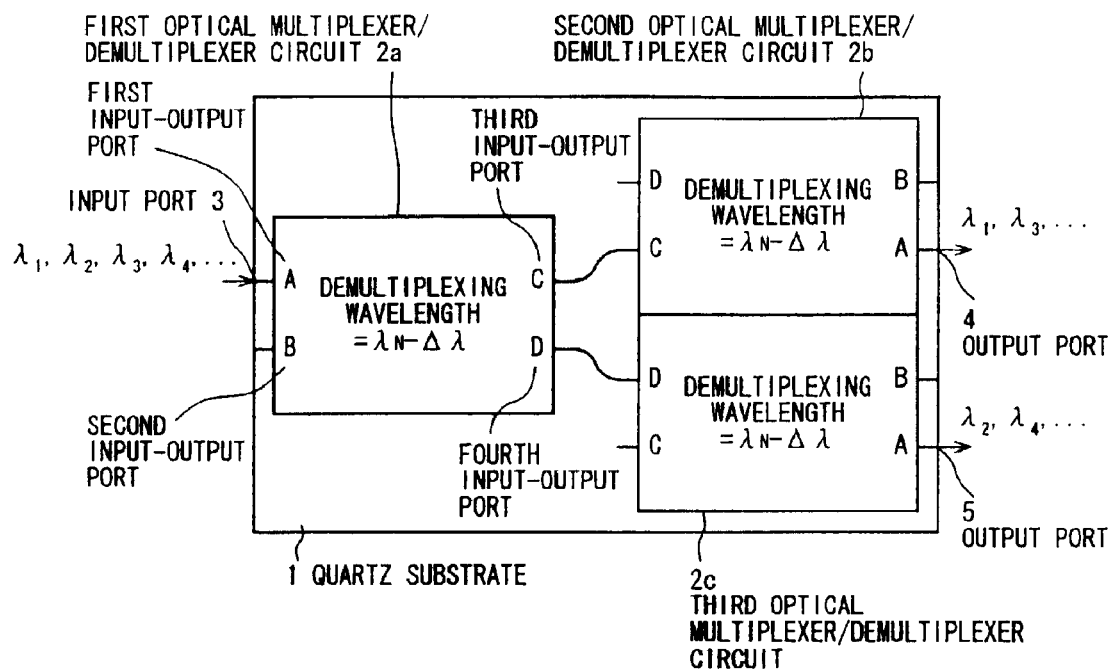
FIG. 7(a) is an explanatory view showing an arrangement of first to third optical multiplexer/demultiplexer circuits of a preferred embodiment of the present invention.
Figure 7B:
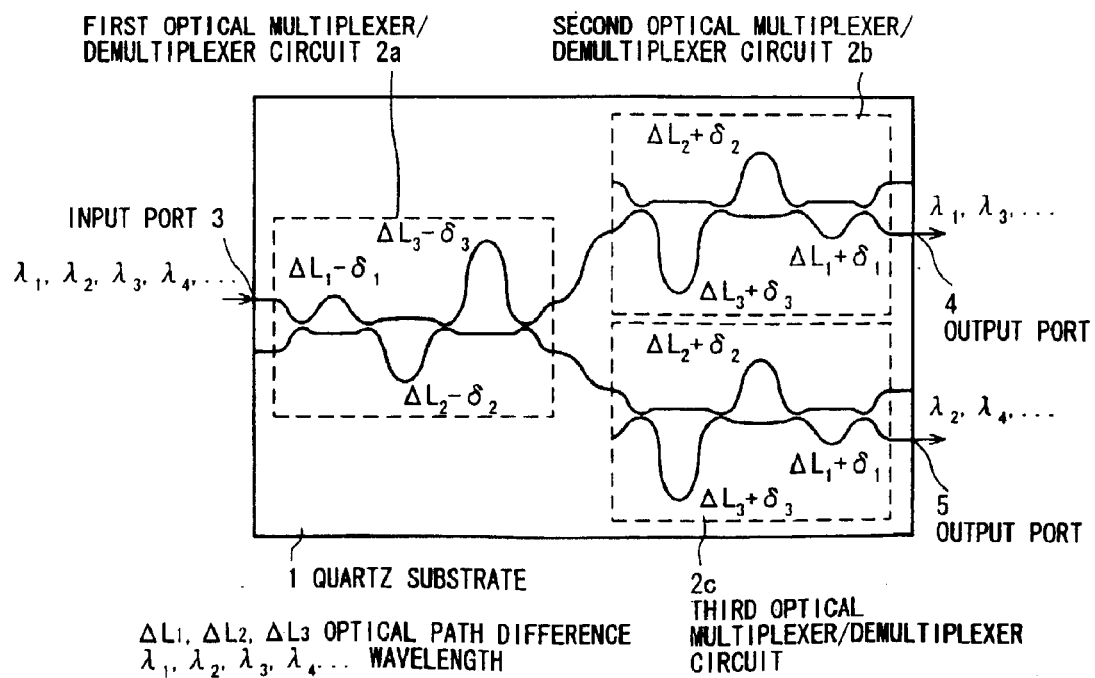
FIG. 7(b) is an explanatory view showing connecting state of waveguides of first to third optical multiplexer/demultiplexer circuits of a preferred embodiment of the present invention.

In FIG. 7(a) and FIG. 7(b), numeral 1 denotes quartz substrate, numeral 2a denotes first optical multiplexer/demultiplexer circuit, numeral 2b denotes second optical multiplexer/demultiplexer circuit and numeral 2c denotes third optical multiplexer/demultiplexer circuit, these optical multiplexer/demultiplexer circuits 2a, 2b, 2c are all formed on the quartz substrate 1. As shown in FIG. 7(b), these optical multiplexer/demultiplexer circuits 2a, 2b, 2c are constitution of Mach-Zehnder interference circuit shown in FIG. 2.

According to the above, when wavelength division multiplex signals having predetermined wavelength spacing and wavelength $\lambda_1, \lambda_2, \lambda_3, \lambda_4, \lambda_5, \lambda_6 \ldots$ are input through the first input-output port A, multiplex signals of odd channel wavelength $\lambda_1, \lambda_3, \lambda_5 \ldots$ are output from the third input-output port C, and multiplex signals of even channel wavelength $\lambda_2, \lambda_4, \lambda_6 \ldots$ are output from the fourth input-output port D. Further, when wavelength division multiplex signals of wavelength $\lambda_1, \lambda_2, \lambda_3, \lambda_4, \lambda_5, \lambda_6 \ldots$ are input through the second input-output port B, multiplex signals of odd channel wavelength $\lambda_1, \lambda_3, \lambda_5 \ldots$ are output from the fourth input-output port D, and multiplex signals of even channel wavelength $\lambda_2, \lambda_4, \lambda_6 \ldots$ are output from the third input-output port C.

In optical multiplexer/demultiplexer circuits 2a, 2b, 2c, input-output ports A, B, C, D are connected as follows. Namely, the third input-output port C of the optical multiplexer/demultiplexer circuit 2a is connected to the third input-output port C of the second optical multiplexer/demultiplexer circuit 2b, and the fourth input-output port D of the first optical multiplexer/demultiplexer circuit 2a is connected to the fourth input-output port D of the third optical multiplexer/demultiplexer circuit 2c. By these connection, the first input-output port A of the optical multiplexer/demultiplexer circuit 2a is selected as the whole input port, and first input-output ports A of second and third optical multiplexer/demultiplexer circuits 2b, 2c is selected as output port 4, 5.

Further, in this embodiment, demultiplex wavelength (center wavelength) of the first optical multiplexer/demultiplexer circuit 2a is shifted slight wavelength $\Delta\lambda$ to short wave direction in respect of center wavelength $\lambda_n$ of system, and demultiplex wavelength (center wavelength) of second and third optical multiplexer/demultiplexer circuits 2b, 2c is shifted slight wavelength $\Delta\lambda$ to long wave direction in respect of center wavelength $\lambda_n$ of system.

Furthermore, in this embodiment, symbols $\lambda_n$, $\Delta\lambda$, $\Delta L_1$, $\Delta L_2$, $\Delta L_3$ as shown in figures or items relating to these symbols are same as explained in connection with FIG. 1(a), FIG. 1(b), FIG. 5(a) and FIG. 5(b). Furthermore, in this embodiment, waveguide is planer type comprising a core formed of Ge doped quartz glass, clad formed of pure quartz glass and substrate formed of pure quartz. The optical multiplexer/demultiplexer is prepared by forming core layer by sputtering on substrate 1, then forming core pattern as shown in FIG. 7(b) by photolithography or RIE, and then forming cladding of pure quartz by plasma CVD.

Figure 8:
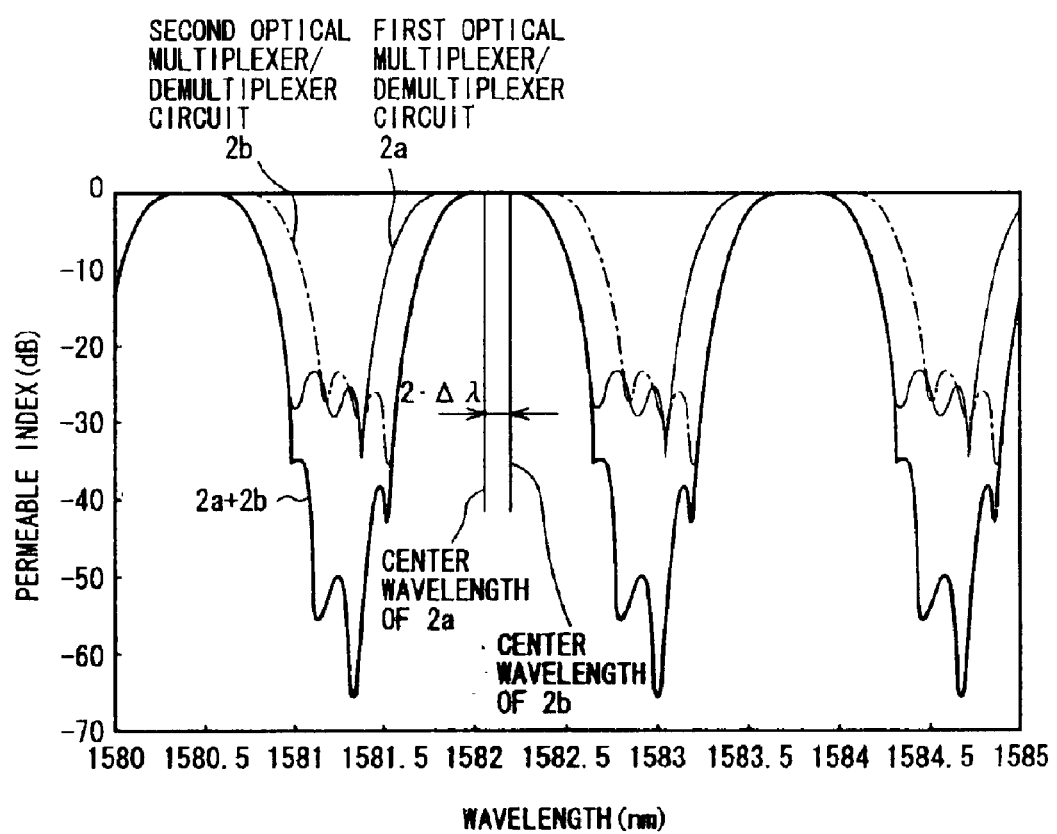
FIG. 8 is an explanatory view showing wavelength permeable index characteristics of a preferred embodiment of the present invention.

Referring to FIG. 8, an operation of a waveguide-type optical multiplexer/demultiplexer in this embodiment will be explained. FIG. 8 shows wavelength permeable index characteristics of first and second optical multiplexer/demultiplexer circuits 2a, 2b and the whole optical multiplexer/demultiplexer. According to the figure, permeable index characteristic curve between the first optical multiplexer/demultiplexer circuit 2a and the second optical multiplexer/demultiplexer circuit 2b is identical, but shifted $2 \cdot \Delta\lambda$ to wavelength direction.

Figure 4:
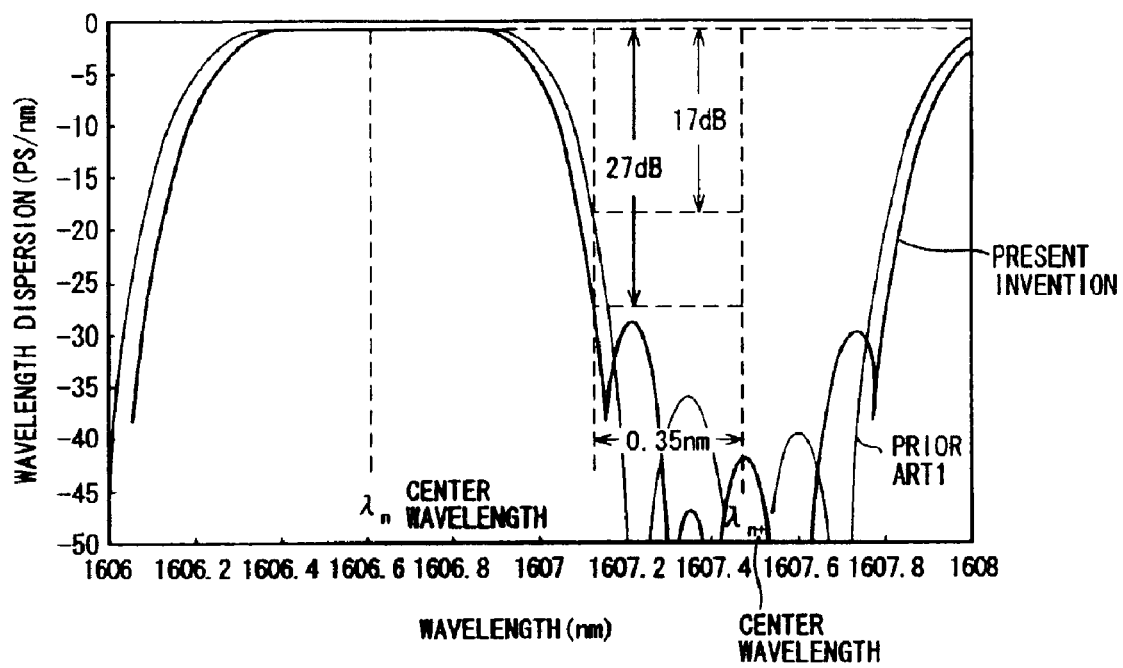
FIG. 4 is an explanatory view showing crosstalk from channel of center wavelength $\lambda_{n+1}$ to channel of center wavelength $\lambda_n$.
Figure 5A:
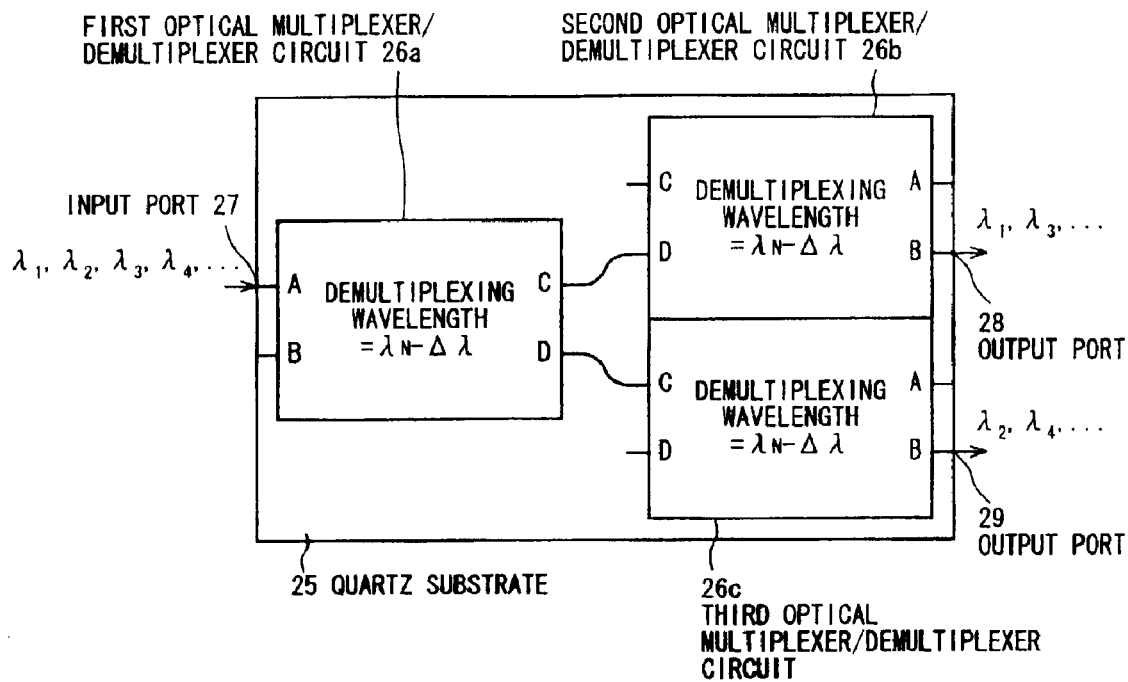
FIG. 5(a) is an explanatory view showing an arrangement of first to third optical multiplexer/demultiplexer circuits of another prior art.
Figure 5B:
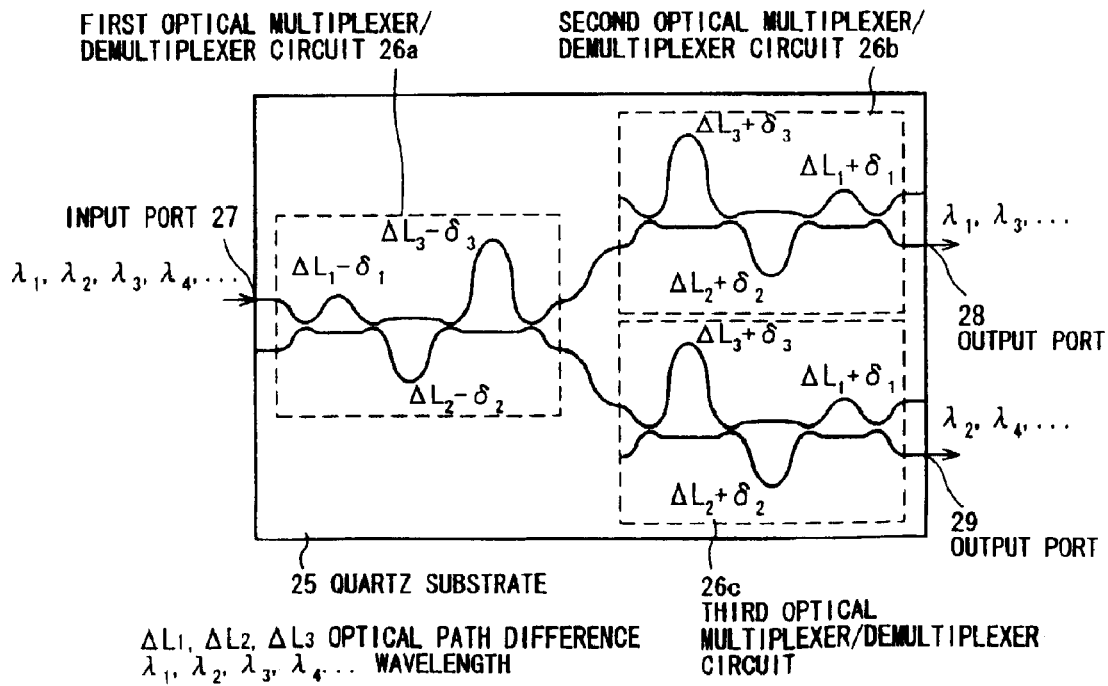
FIG. 5(b) is an explanatory view showing connecting state of waveguides of first to third optical multiplexer/demultiplexer circuits of another prior art.
Figure 6:
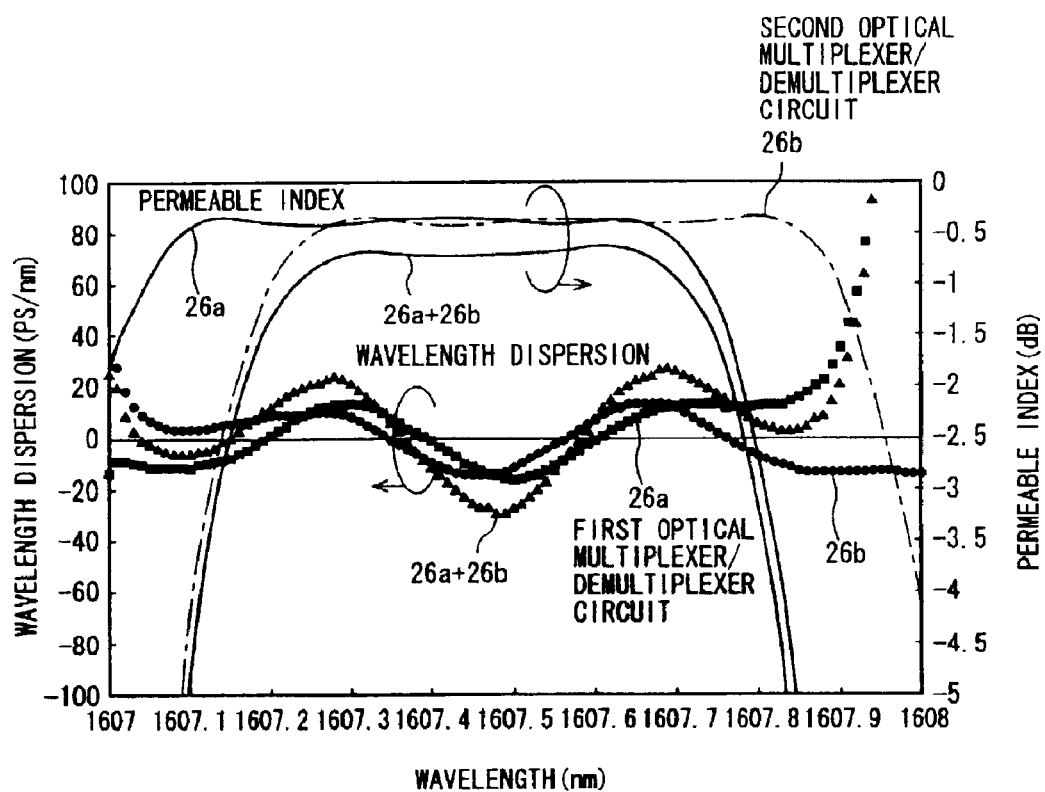
FIG. 6 is an explanatory view showing wavelength dispersion characteristics and permeable index characteristics of another prior art.

This difference of $2 \cdot \Delta\lambda$ operates to extend low crosstalk range wider than prior art 1 as apparent from characteristics of this invention shown in FIG. 4, consequently crosstalk characteristic of 0.35 nm apart from neighboring channel wavelength $\lambda_{n+1}$ is improved. Namely, while crosstalk characteristic at the same position of prior art 1 is 17 dB, crosstalk characteristic of the present invention shows 27 dB. This crosstalk level according to the present invention exceeds prior art 1 by 10 dB.

Still more, the optical multiplexer/demultiplexer of prior art 2 as described above is possible to improve crosstalk characteristics as same degree as the present invention. However, in case of prior art 2, accompanied with 2·Δλ shift, wavelength dispersion characteristic of optical multiplexer/demultiplexer circuit 26a and 26b overlap together. Therefore, increase of the whole wavelength dispersion occurs.

Figure 9:
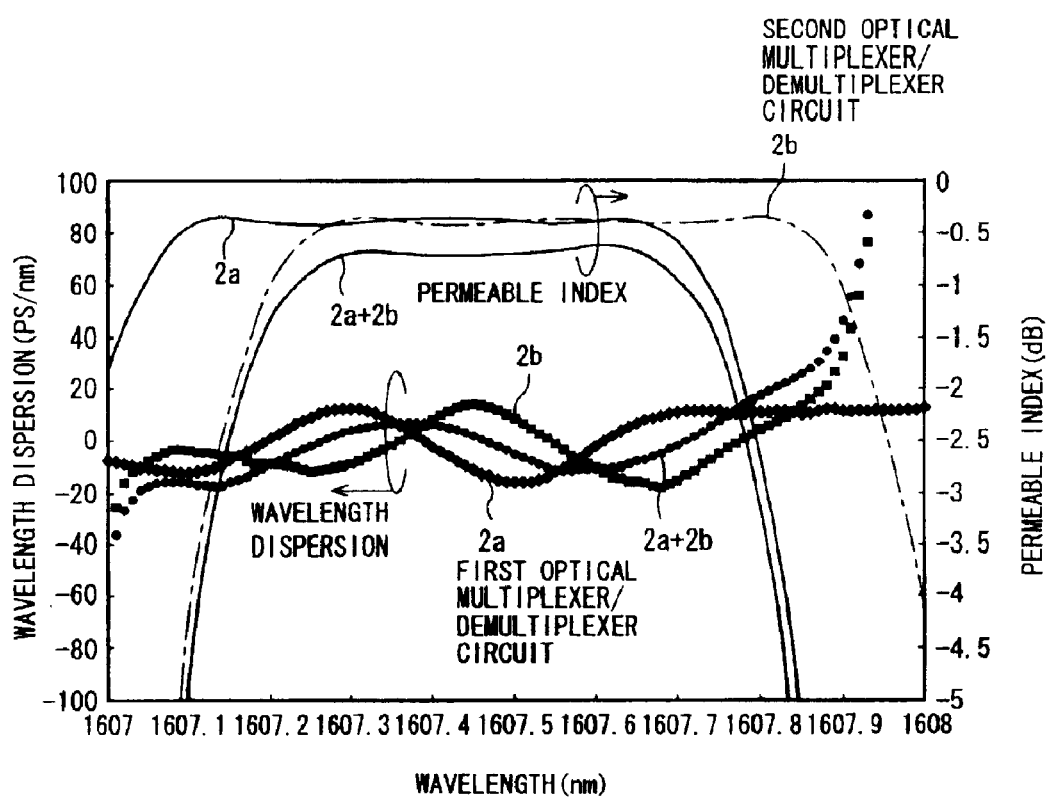
FIG. 9 is an explanatory view showing wavelength dispersion characteristics of an optical multiplexer/demultiplexer of a preferred embodiment of the present invention.

In this respect, if connecting form between multiplexer/demultiplexer circuits is taken place as explained in this embodiment, there is no possibility of increasing wavelength dispersion, therefore, constitution of an optical multiplexer/demultiplexer provided with excellent characteristics become possible. FIG. 9 shows wavelength dispersion characteristics of an optical multiplexer/demultiplexer in accordance with this embodiment. Wavelength dispersion is held low by 2·Δλ shift.

Figure 10A:
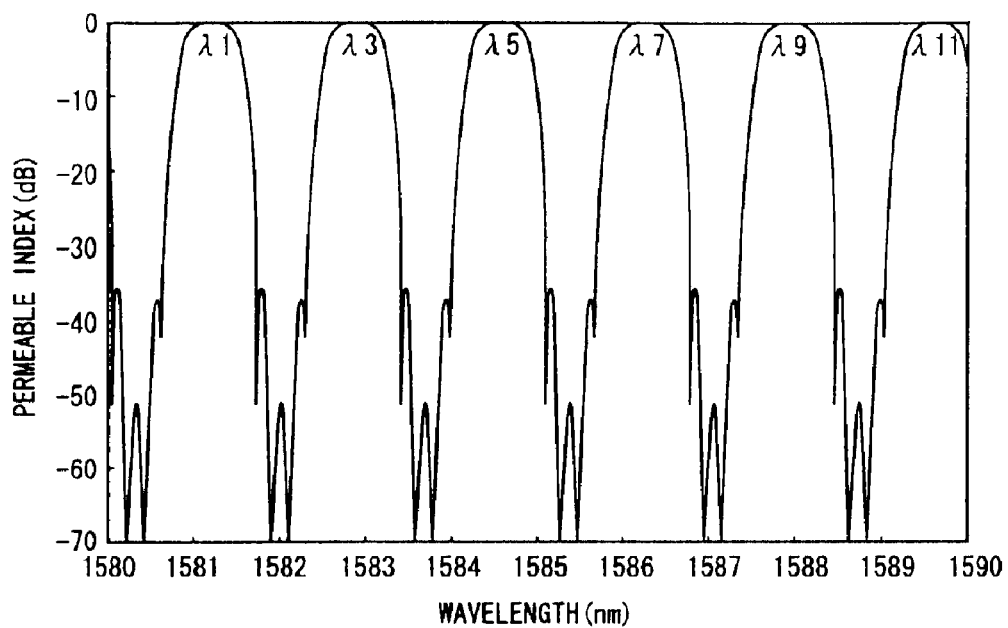
FIG. 10(a) is an explanatory view showing wavelength permeable index characteristics at output port 4 of a preferred embodiment of the present invention.
Figure 10B:
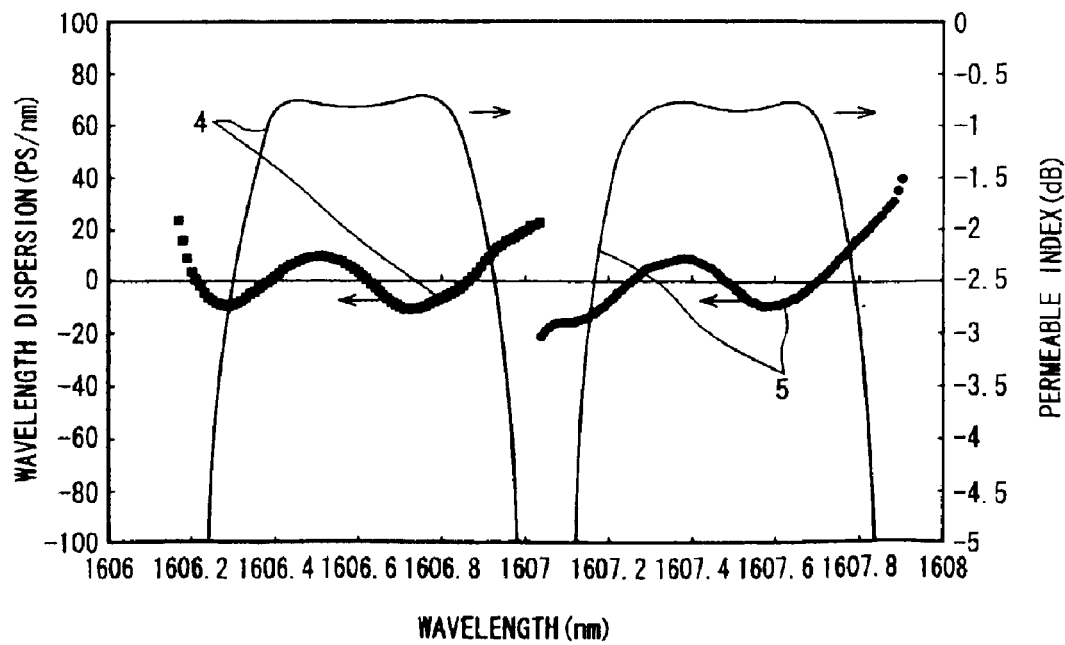
FIG. 10(b) is an explanatory view showing wavelength dispersion characteristics and permeable index characteristics of path band at output ports 4, 5 of a preferred embodiment of the present invention.
Figure 11:
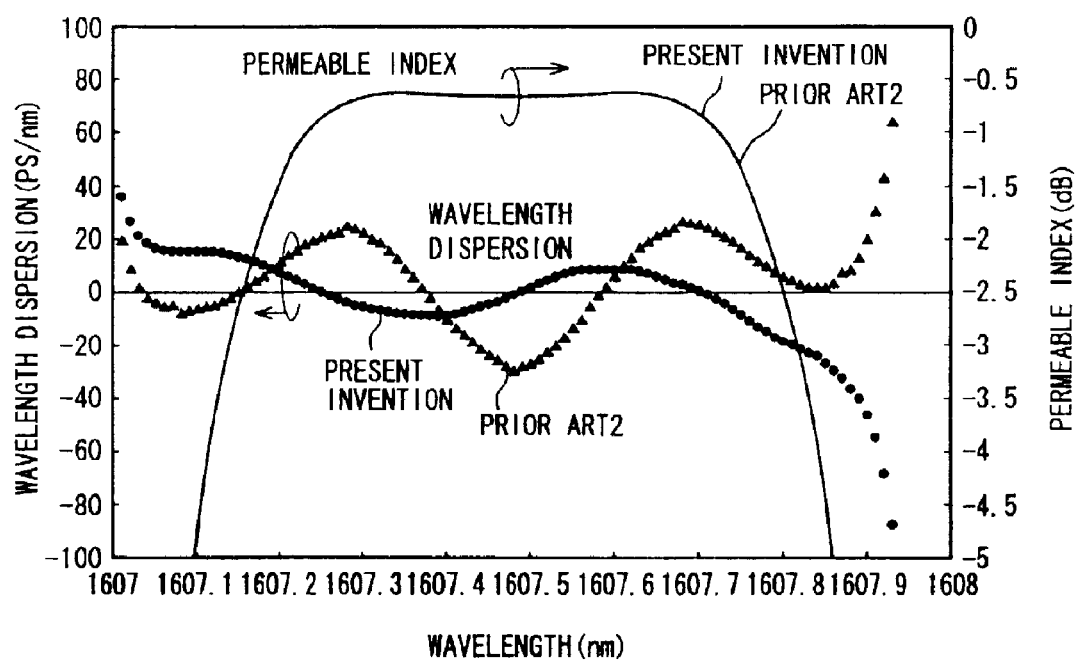
FIG. 11 is an explanatory view showing suppressing effect of increasing wavelength dispersion as a result of a preferred embodiment of the present invention.

FIG. 10(a) and FIG. 10(b) show wavelength permeable index characteristics at output port 4, and wavelength dispersion characteristics and permeable index characteristics of path band at output ports 4, 5, in every case excellent results are shown. Referring to FIG. 4, low crosstalk characteristic which is the first effect of the present invention is shown in comparison with prior art 1, in spite of narrowing path band, extension of low crosstalk wavelength region exhibiting below −25 dB in inhibiting region is recognized. Further, according to FIG. 11, as a method for realizing low crosstalk characteristics, suppressing effect of increasing wavelength dispersion is remarkably appeared due to constitution shown in FIG. 7(a) and FIG. 7(b).

As explained above, a waveguide-type optical multiplexer/demultiplexer according to this embodiment shows excellent characteristics and is recognized to have high practicability.

Figure 12A:
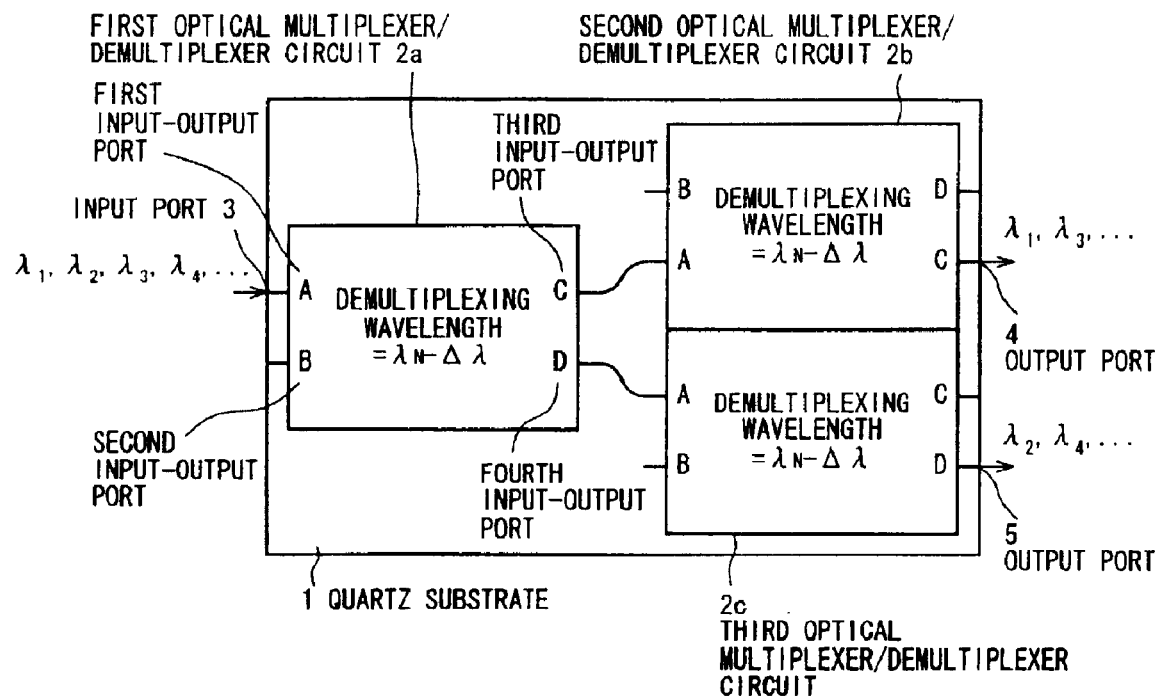
FIG. 12(a) is an explanatory view showing an arrangement of first to third optical multiplexer/demultiplexer circuits of another preferred embodiment of the present invention.
Figure 12B:
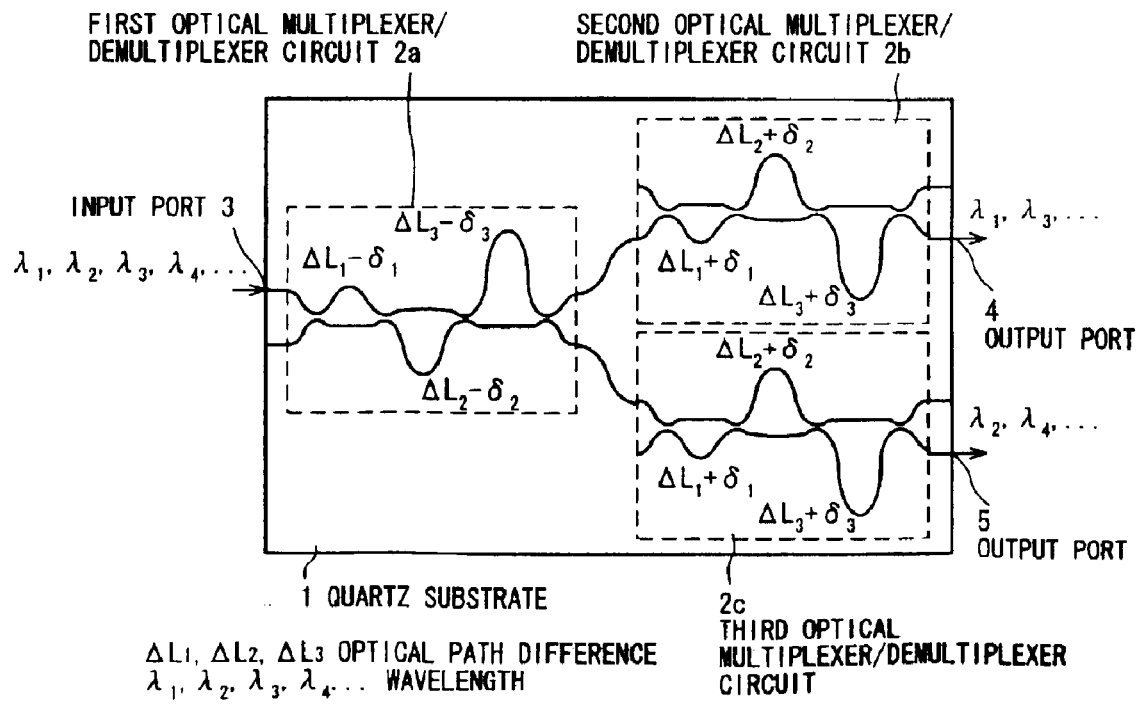
FIG. 12(b) is an explanatory view showing connecting state of waveguides of first to third optical multiplexer/demultiplexer circuits of another preferred embodiment of the present invention.

FIG. 12(a) and FIG. 12(b) show another preferred embodiment of a waveguide-type optical multiplexer/demultiplexer according to the present invention. This embodiment is different from the embodiment shown in FIG. 7(a) and FIG. 7(b) in that the second optical multiplexer/demultiplexer circuit 2b and the third optical multiplexer/demultiplexer circuit 2c are located reversely, the third input-output port C of the optical multiplexer/demultiplexer circuit 2a is connected to the first input-output port A of the second optical multiplexer/demultiplexer circuit 2b, the fourth input-output port D of the first optical multiplexer/demultiplexer circuit 2a is connected to the first input-output port A of the third optical multiplexer/demultiplexer circuit 2c, the third input-output port C of the optical multiplexer/demultiplexer circuit 2b is selected as an odd wavelength output port 4, and the fourth input-output port D of the optical multiplexer/demultiplexer circuit 2c is selected as an even wavelength output port 5.

Figure 13:
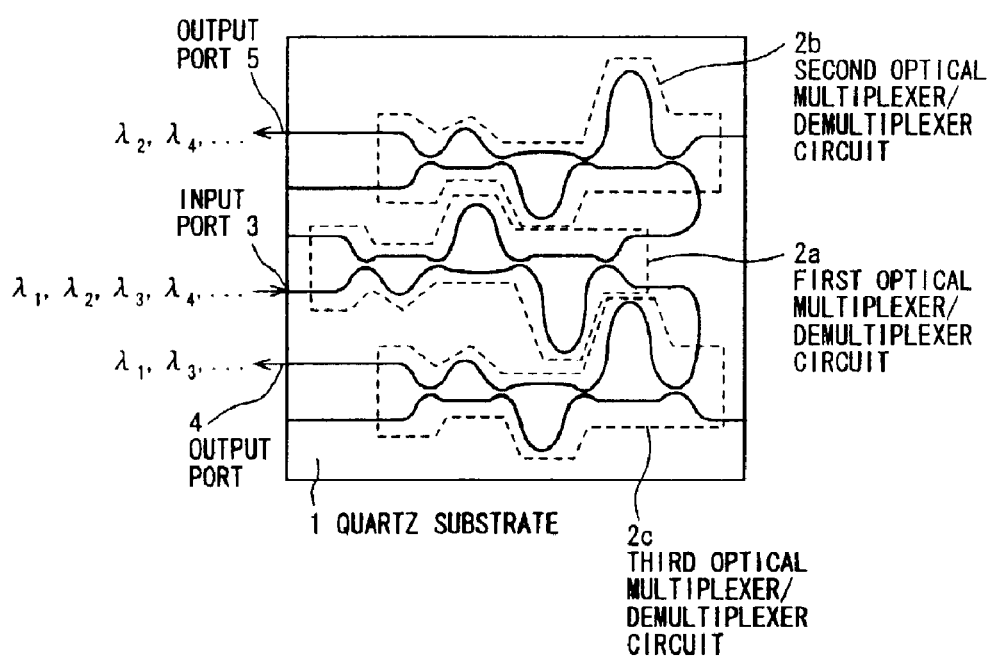
FIG. 13 is an explanatory view showing still another preferred embodiment of the present invention.

FIG. 13 shows still another preferred embodiment of a waveguide-type optical multiplexer/demultiplexer according to the present invention. This embodiment is different from other embodiments in that first to third optical multiplexer/demultiplexer circuits 2a, 2b, 2c are arranged parallel each other, and input port 3 and output port 4, 5 are located in same side. According to this embodiment, compactness of the whole constitution is advantageously obtained. Still more, demultiplex wavelength of optical multiplexer/demultiplexer circuits 2a, 2b, 2c is same as other embodiments.

According to embodiments of waveguide-type optical multiplexer/demultiplexer as shown in FIG. 12(a), FIG. 12(b) and FIG. 13, same level of crosstalk characteristics and wavelength dispersion characteristics as the optical multiplexer/demultiplexer shown in FIG. 7(a) and FIG. 7(b) are obtained.

Figure 14:
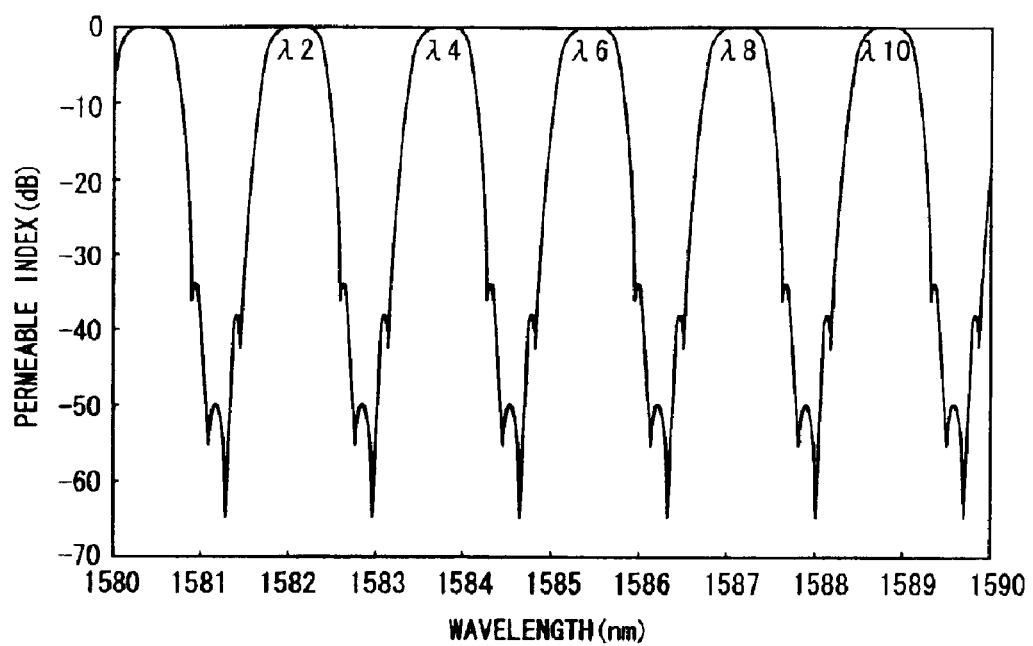
FIG. 14 is an explanatory view showing wavelength permeable index characteristics of another preferred embodiment of the present invention.

FIG. 14 shows wavelength permeable index characteristics at output port 5 of the optical multiplexer/demultiplexer shown in FIG. 12(a) and FIG. 12(b).

In the above embodiments, planer waveguide-type optical multiplexer/demultiplexers were explained, however, the present invention is also applicable to bulk waveguide-type optical multiplexer/demultiplexer or optical fiber waveguide-type optical multiplexer/demultiplexer.

As described above in detail, according to the present invention characterized in that a waveguide-type optical multiplexer/demultiplexer provided with Mach-Zehnder interference circuits connected in multistage, comprising first, second and third optical multiplexer/demultiplexer circuits constituted to input wavelength division multiplex signals having predetermined wavelength spacing and wavelength $\lambda_{.1}, \lambda_{.2}, \lambda_{.3}, \lambda_{.4}, \lambda_5, \lambda_6 \ldots$ through a first input-output port and to output multiplex signals of odd wavelength $\lambda_1, \lambda_{.3}, \lambda_5 \ldots$ from a third input-output port and multiplex signals of even wavelength $\lambda_{.2}, \lambda_4, \lambda_6 \ldots$ from a fourth input-output port, and to input wavelength division multiplex signals of wavelength $\lambda_1, \lambda_2, \lambda_3, \lambda_4, \lambda_5, \lambda_6 \ldots$ through a second input-output port and to output multiplex signals of odd wavelength $\lambda_1, \lambda_3, \lambda_5 \ldots$ from a fourth input-output port and multiplex signals of even wavelength $\lambda_2, \lambda_4, \lambda_6 \ldots$ from a third input-output port, said third input-output port of said first optical multiplexer/demultiplexer circuit is connected to said third (or first) input-output port of said second optical multiplexer/demultiplexer circuit, and said fourth input-output port of said first optical multiplexer/demultiplexer circuit is connected to said fourth (or first) input-output port of said third optical multiplexer/demultiplexer circuit, said wavelength division multiplex signals having wavelength $\lambda_1, \lambda_2, \lambda_3, \lambda_4, \lambda_5, \lambda_6 \ldots$ are input through said first input-output port of said first optical multiplexer/demultiplexer circuit, multiplex signals of odd wavelength $\lambda_1, \lambda_3, \lambda_5 \ldots$ are output from said first (or third) input-output port of said second optical multiplexer/demultiplexer circuit, and multiplex signals of even wavelength $\lambda_2, \lambda_4, \lambda_6 \ldots$ are output from said first (or fourth) input-output port of said third optical multiplexer/demultiplexer circuit, an excellent optical multiplexer/demultiplexer provided with low crosstalk characteristics and reduced wavelength dispersion characteristics is obtained.

What is claimed is:

1. A waveguide-type optical multiplexer/demultiplexer provided with Mach-Zehnder interference circuits connected in multistage, comprising:

first; second and third optical multiplexer/demultiplexer circuits, wherein said each optical multiplexer/demultiplexer circuit comprises first to fourth input-output ports that are operable to input wavelength division multiplex signals having predetermined wavelength spacing and wavelength $\lambda_1, \lambda_2, \lambda_3, \lambda_4, \lambda_5, \lambda_6 \ldots$ through said first input-output port and to output multiplex signals of odd wavelength $\lambda_1, \lambda_3, \lambda_5 \ldots$ from said third input-output port and multiplex signals of even wavelength $\lambda_2$, $\lambda_4$, $\lambda_6$ . . . from said fourth input-output port, and to input said wavelength division multiplex signals of wavelength $\lambda_1$, $\lambda_2$, $\lambda_3$, $\lambda_4$, $\lambda_5$, $\lambda_6$ . . . through a second input-output port and to output multiplex signals of odd wavelength $\lambda_1$, $\lambda_3$, $\lambda_5$ . . . from said fourth input-output port and multiplex signals of even wavelength $\lambda_2$, $\lambda_4$, $\lambda_6$ . . . from said third input-output port, wherein said third input-output port of said first optical multiplexer/demultiplexer circuit is connected to said third input-output port of said second optical multiplexer/demultiplexer circuit, and said fourth input-output port of said first optical multiplexer/demultiplexer circuit is connected to said fourth input-output port of said third optical multiplexer/demultiplexer circuit, and wherein said wavelength division multiplex signals having wavelength $\lambda_1$, $\lambda_2$, $\lambda_3$, $\lambda_4$, $\lambda_5$, $\lambda_6$ . . . are input through said first input-output port of said first optical multiplexer/demultiplexer circuit, multiplex signals of odd wavelength $\lambda_1$, $\lambda_3$, $\lambda_5$ . . . are output from said first input-output port of said second optical multiplexer/demultiplexer circuit, and multiplex signals of even wavelength $\lambda_2$, $\lambda_4$, $\lambda_6$ . . . are output from said first input-output port of said third optical multiplexer/demultiplexer circuit.

2. The waveguide-type optical multiplexer/demultiplexer provided with Mach-Zehnder interference circuits connected in multistage, according to claim 1, wherein:

said first optical multiplexer/demultiplexer circuit multiplexes or demultiplexes wavelength which is shifted slight wavelength $\Delta\lambda$ to short wave direction or long wave direction in respect of wavelength $\lambda_1$, $\lambda_2$, $\lambda_3$, $\lambda_4$, $\lambda_5$, $\lambda_6$ . . . as a center wavelength, and said second and third optical multiplexer/demultiplexer circuits multiplexes or demultiplexes wavelength which is shifted slight wavelength $\Delta\lambda$ to short wave direction or long wave direction in respect of wavelength $\lambda_1$, $\lambda_2$, $\lambda_3$, $\lambda_4$, $\lambda_5$, $\lambda_6$ . . . as a center wavelength.

3. The waveguide-type optical multiplexer/demultiplexer provided with Mach-Zehnder interference circuits connected in multistage, according to claim 1, wherein:

said first, second and third optical multiplexer/demultiplexer circuits are arranged parallel each other.

4. A waveguide-type optical multiplexer/demultiplexer provided with Mach-Zehnder interference circuits connected in multistage, comprising: first; second and third optical multiplexer/demultiplexer circuits, wherein said each optical multiplexer/demultiplexer circuit comprises first to fourth input-output ports that are operable to input wavelength division multiplex signals having predetermined wavelength spacing and wavelength $\lambda_1$, $\lambda_2$, $\lambda_3$, $\lambda_4$, $\lambda_5$, $\lambda_6$ . . . through said first input-output port and to output multiplex signals of odd wavelength $\lambda_1$, $\lambda_3$, $\lambda_5$ . . . from said third input-output port and multiplex signals of even wavelength $\lambda_2$, $\lambda_4$, $\lambda_6$ . . . from said fourth input-output port, and to input said wavelength division multiplex signals of wavelength $\lambda_1$, $\lambda_2$, $\lambda_3$, $\lambda_4$, $\lambda_5$, $\lambda_6$ . . . through a second input-output port and to output multiplex signals of odd wavelength $\lambda_1$, $\lambda_3$, $\lambda_5$ . . . from said fourth input-output port and multiplex signals of even wavelength $\lambda_2$, $\lambda_4$, $\lambda_6$ . . . from said third input-output port, wherein said third input-output port of said first optical multiplexer/demultiplexer circuit is connected to said first input-output port of said second optical multiplexer/demultiplexer circuit, and said fourth input-output port of said first optical multiplexer/demultiplexer circuit is connected to said first input-output port of said third optical multiplexer/demultiplexer circuit, and wherein said wavelength division multiplex signals having wavelength $\lambda_1$, $\lambda_2$, $\lambda_3$, $\lambda_4$, $\lambda_5$, $\lambda_6$ . . . are input through said first input-output port of said first optical multiplexer/demultiplexer circuit, multiplex signals of odd wavelength $\lambda_1$, $\lambda_3$, $\lambda_5$ . . . are output from said third input-output port of said second optical multiplexer/demultiplexer circuit, and multiplex signals of even wavelength $\lambda_2$, $\lambda_4$, $\lambda_6$ . . . are output from said fourth input-output port of said third optical multiplexer/demultiplexer circuit.

5. The waveguide-type optical multiplexer/demultiplexer provided with Mach-Zehnder interference circuits connected in multistage, according to claim 4, wherein:

said first optical multiplexer/demultiplexer circuit multiplexes or demultiplexes wavelength which is shifted slight wavelength $\Delta\lambda$ to short wave direction or long wave direction in respect of wavelength $\lambda_1$, $\lambda_2$, $\lambda_3$, $\lambda_4$, $\lambda_5$, $\lambda_6$ . . . as a center wavelength, and said second and third optical multiplexer/demultiplexer circuits multiplexes or demultiplexes wavelength which is shifted slight wavelength $\Delta\lambda$ to short wave direction or long wave direction in respect of wavelength $\lambda_1$, $\lambda_2$, $\lambda_3$, $\lambda_4$, $\lambda_5$, $\lambda_6$ . . . as a center wavelength.

6. The waveguide-type optical multiplexer/demultiplexer provided with Mach-Zehnder interference circuits connected in multistage, according to claim 4, wherein:

said first, second and third optical multiplexer/demultiplexer circuits are arranged parallel each other.

* * * * *